United States Patent
Jiang et al.

(10) Patent No.: US 10,442,973 B1
(45) Date of Patent: Oct. 15, 2019

(54) SUPER-AMPHIPHOBIC STRONGLY SELF-CLEANING HIGH-PERFORMANCE WATER-BASED DRILLING FLUID AND DRILLING METHOD

(71) Applicant: China University of Petroleum (Beijing), Beijing (CN)

(72) Inventors: Guancheng Jiang, Beijing (CN); Xiaoxiao Ni, Beijing (CN); Lili Yang, Beijing (CN); Yinbo He, Beijing (CN); Xiaohu Quan, Beijing (CN); Zhong Li, Beijing (CN); Xiaoyong Wang, Beijing (CN); Yongbin Guo, Beijing (CN); Fabin Xu, Beijing (CN); Zhengqiang Deng, Beijing (CN); Xi Wang, Beijing (CN); Deli Gao, Beijing (CN); Kai Wang, Beijing (CN); Xuwu Luo, Beijing (CN); Chunyao Peng, Beijing (CN)

(73) Assignee: CHINA UNIVERSITY OF PETROLEUM (BEIJING), Beijing (CN)

( * ) Notice: Subject to any disclaimer, the term of this patent is extended or adjusted under 35 U.S.C. 154(b) by 0 days.

(21) Appl. No.: 16/392,395

(22) Filed: Apr. 23, 2019

(30) Foreign Application Priority Data

May 23, 2018 (CN) .......................... 2018 1 0503390

(51) Int. Cl.
    *C09K 8/24* (2006.01)
    *E21B 21/00* (2006.01)
    *C09K 8/16* (2006.01)

(52) U.S. Cl.
    CPC .................. *C09K 8/24* (2013.01); *C09K 8/16* (2013.01); *E21B 21/00* (2013.01); *C09K 2208/10* (2013.01)

(58) Field of Classification Search
    CPC .... C09K 8/032; C09K 8/5083; C09K 8/5045; C09K 2208/10; C09K 2208/34
    See application file for complete search history.

(56) References Cited

U.S. PATENT DOCUMENTS 10,308,857 B1 * 6/2019 Jiang ...................... C09K 8/032
2018/0134949 A1 * 5/2018 Monastiriotis ......... C09K 8/805

FOREIGN PATENT DOCUMENTS

| CN | 102718920 A | 10/2012 |
| CN | 103130968 A | 6/2013 |
| CN | 103387645 A | 11/2013 |
| CN | 104974289 A | 10/2015 |

* cited by examiner

*Primary Examiner* — Jeffrey C Mullis
(74) *Attorney, Agent, or Firm* — Calfee, Halter & Griswold LLP

(57) ABSTRACT

The invention relates to the field of petroleum drilling fluids, and discloses a super-amphiphobic strongly self-cleaning high-performance water-based drilling fluid comprising polymeric super-amphiphobic agent and a drilling method. The polymeric super-amphiphobic agent comprises structural units A derived from acrylamide, structural units B derived from methyl methacrylate, structural units C derived from butyl acrylate, structural units D derived from a compound represented by the following formula (1), structural units E derived from a silane coupler, and nano-titania; wherein the nano-titania is bonded to the polymeric super-amphiphobic agent via the structural unit E, and the silane coupler is a silane coupler having double bonds; R is a C3-C8 perfluoroalkyl group. A water-based drilling fluid additive prepared from the polymeric super-amphiphobic agent in the present invention has excellent wettability, inhibition, lubrication, reservoir protection, and rheology and fluid loss properties.

formula (1)

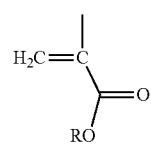

15 Claims, No Drawings

SUPER-AMPHIPHOBIC STRONGLY SELF-CLEANING HIGH-PERFORMANCE WATER-BASED DRILLING FLUID AND DRILLING METHOD

CROSS REFERENCE TO RELATED APPLICATIONS

The application claims priority to Chinese Application No. 201810503390.2, filed on May 23, 2018, entitled "Polymeric Super-Amphiphobic Agent and Super-Amphiphobic Strongly Self-Cleaning High-Performance Water-Based Drilling Fluid", which is specifically and entirely incorporated by reference.

FIELD

The present invention relates to the field of petroleum drilling fluids, particularly to a super-amphiphobic strongly self-cleaning high-performance water-based drilling fluid and a drilling method.

BACKGROUND

At present, facing the complex geological conditions, deep reservoir burial, and high drilling difficulties involved in dense sandstone oil-gas reservoirs, oil-based drilling fluid systems are mainly used for safe and efficient drilling in the process of dense sandstone oil-gas reservoir exploitation. However, oil-based drilling fluids involve high cost and difficulties in disposal of drill cuttings, and can't fully meet the demand for economic and environment-friendly exploitation of dense sandstone oil-gas reservoirs. Hence, there is an urgent need for using water-based drilling fluids to meet the demand for sustainable exploration and development of dense sandstone oil-gas reservoirs. However, conventional water-based drilling fluids currently used can't satisfactorily meet the requirements of drilling and exploitation of dense sandstone oil-gas reservoirs, and have problems mainly in the following aspects.

(1) Hydrate inhibition performance: conventional hydrate inhibitors can't satisfactorily meet the requirements of drilling and exploitation of dense sandstone oil-gas reservoirs, and the inhibition property of water-based drilling fluids can't effectively inhibit dispersion of drill cuttings and protect the particle size distribution in the drilling fluid systems.

(2) Plugging performance: conventional plugging agents can't satisfactorily maintain reasonable particle size distribution in the drilling fluid system, and can't effectively meet the requirements for plugging and mass transfer energy transfer blocking in dense sandstone oil-gas reservoirs and can't stabilize the borehole wall in shale formations.

(3) Lubricating performance: conventional lubricants and their rheological parameters are still incomparable with the properties of oil-based drilling fluids, and can't meet the requirements for efficient lubrication in operation in long horizontal wellbores and surface lubrication of cuttings bed.

Owing to the limitations of well sites (e.g., drilling platforms in remote regions) or the increase of material transportation costs, and the engineering requirements of high-temperature wells in complex structures, there is an increasingly higher demand for a super-amphiphobic strongly self-cleaning high-performance drilling fluid system that can attain a good effect with a small amount of drilling fluid. Therefore, it is urgent to develop a water-based drilling fluid system that can effectively solve the technical problems of high friction resistance, damages to oil-gas reservoir, and borehole collapse encountered in the drilling and exploitation of dense sandstone oil-gas reservoirs.

SUMMARY

To solve the above problems existing in the prior art, the present invention provides a super-amphiphobic strongly self-cleaning high-performance water-based drilling fluid and a drilling method, in which a water-based drilling fluid additive having excellent wettability, inhibition, lubrication, reservoir protection, and rheology and fluid loss properties is used.

To attain the objects described above, in a first aspect, the present invention provides a super-amphiphobic strongly self-cleaning high-performance water-based drilling fluid comprising a super-amphiphobic strongly self-cleaning high-performance water-based drilling fluid, the polymeric super-amphiphobic agent comprising a polymeric super-amphiphobic agent comprising structural units A derived from acrylamide, structural units B derived from methyl methacrylate, structural units C derived from butyl acrylate, structural units D derived from a compound represented by the following formula (1), structural units E derived from a silane coupler, and nano-titania; wherein the nano-titania is bonded to the polymeric super-amphiphobic agent via the structural unit E, the silane coupler is a silane coupler with double bonds;

formula (1)

R is a C3-C8 perfluoroalkyl group.

In a second aspect, the present invention provides a drilling method, which uses a polymeric super-amphiphobic agent comprising structural units A derived from acrylamide, structural units B derived from methyl methacrylate, structural units C derived from butyl acrylate, structural units D derived from a compound represented by the following formula (1), structural units E derived from a silane coupler, and nano-titania as an additive in a drilling fluid;

wherein the nano-titania is bonded to the polymeric super-amphiphobic agent via the structural unit E,
the silane coupler is a silane coupler with double bonds;

formula (1)

R is a C3-C8 perfluoroalkyl group.

With the above technical scheme, the polymeric super-amphiphobic agent provided in the invention can effectively improve and modify the wettability of a reservoir to be super-amphiphobic, and a water-based drilling fluid prepared with the polymeric super-amphiphobic agent can effectively inhibit hydration, swelling and dispersion of the clay in the reservoir, effectively improve the lubrication performance of the system, drill cuttings and drilling tools, has excellent reservoir protection performance, adjustable density, and is non-toxic, pollution-free, safe and environment-friendly.

The main components of a conventional oil-based drilling fluid include: internal and external phases formed by base phase oil and salt, a suspending agent, a filtrate reducer, a wetting agent, an emulsifier, and a shearing strength improving agent; the main components of a conventional water-based drilling fluid include: bentonite, an inhibitor, a filtrate reducer, a shearing strength improving agent, a plugging agent, and a weighting material. Compared with conventional water-based drilling fluids, a water-based drilling fluid prepared with the polymeric super-amphiphobic agent provided in the invention has the advantages of simple composition and high efficiency, and can be prepared simply with bentonite, a filtrate reducer, a weighting material, and a plugging material added as required, etc., in addition to the polymeric super-amphiphobic agent provided in the present invention.

DETAILED DESCRIPTION

The ends points and any value in the ranges disclosed in the present invention are not limited to the exact ranges or values; instead, those ranges or values shall be comprehended as encompassing values that are close to those ranges or values. For numeric ranges, the end points of the ranges, the end points of the ranges and the discrete point values, and the discrete point values may be combined with each other to obtain one or more new numeric ranges, which shall be deemed as having been disclosed specifically in this document.

In a first aspect, the present invention provides a polymeric super-amphiphobic agent, comprising structural units A derived from acrylamide, structural units B derived from methyl methacrylate, structural units C derived from butyl acrylate, structural units D derived from a compound represented by the following formula (1), structural units E derived from a silane coupler, and nano-titania; wherein the nano-titania is bonded to the polymeric super-amphiphobic agent via the structural unit E, and the silane coupler is a silane coupler having double bonds;

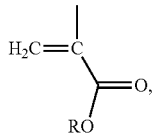

formula (1)

R is a C3-C8 perfluoroalkyl group.
Preferably, R is a C3-C8 linear-chain perfluoroalkyl group.

With the above structure, the polymeric super-amphiphobic agent provided in the present invention has special super-amphiphobic wettability, excellent shale inhibition property, good lubricating property, and good reservoir protection property.

According to the present invention, the C3-C8 perfluoroalkyl group may be perfluoropropyl, perfluorobutyl, perfluoropentyl, perfluorohexyl, perfluoroheptyl, or perfluorooctyl; it may be a linear-chain or branched-chain perfluoroalkyl group, preferably is a linear-chain perfluoroalkyl group, and more preferably is a C5-C8 perfluoroalkyl group or C6-C8 perfluoroalkyl group.

According to the invention, the silane coupler may be any silane coupler, as long as it can be bonded to the structural units A-D and the nano-titania. Preferably, the silane coupler is one or more of γ-(methacryloyloxy) propyl-trimethoxysilane, γ-(2,3-epoxypropoxy) propyl-trimethoxysilane, vinyl-trimethoxysilane, and vinyl-triethoxysilane, more preferably is γ-(methacryloyloxy) propyl-trimethoxysilane. By using the above silane coupler bonded with nano-titania, the obtained polymeric super-amphiphobic agent has an excellent temperature resistance property.

According to the present invention, for a purpose of further improving the temperature resistance property of the polymeric super-amphiphobic agent, the particle diameter of the nano-titania may be 50-200 nm, preferably is 50-100 nm.

According to the present invention, there is no particular restriction on the contents of the structural units A-E and the nano-titania in the polymeric super-amphiphobic agent in the present invention, as long as the polymeric super-amphiphobic agent has super-amphiphobic wettability. For a purpose of obtaining higher super-amphiphobic wettability and higher shale inhibition, lubrication, and reservoir protection properties, etc., preferably, with respect to 1 mol nano-titania, the content of the structural units A is 0.1 mol or higher, the content of the structural units B is 1 mol or higher, the content of the structural units C is 0.5 mol or lower, the content of the structural units D is 0.5-1.5 mol, and the content of the structural units E is 0.5 mol or lower. More preferably, with respect to 1 mol nano-titania, the content of the structural units A is 0.5-4 mol, preferably is 2-4 mol, more preferably is 2-3 mol; the content of the structural units B is 1-2 mol, preferably is 1-1.5 mol; the content of the structural units C is 0.1-0.5 mol, preferably is 0.3-0.5 mol, more preferably is 0.4-0.5 mol; the content of the structural units D is 0.5-1.5 mol, preferably is 0.8-1.2 mol, more preferably is 0.9-1.1 mol; the content of the structural units E is 0.1-0.5 mol, preferably is 0.3-0.5 mol, more preferably is 0.4-0.5 mol.

The mean molecular weight of the polymeric super-amphiphobic agent in the present invention (excluding the nano-titania) is 50,000-200,000, preferably is 50,000-100,000. By making the polymeric super-amphiphobic agent in the present invention have the above molecular weight, the super-amphiphobic wettability, shale inhibition, lubrication, and reservoir protection properties, etc. of the polymeric super-amphiphobic agent can be further improved.

In a second aspect, the present invention provides a method for preparing a polymeric super-amphiphobic agent, comprising: crosslinking a copolymerized product of acrylamide, methyl methacrylate and butyl acrylate, a compound represented by the following formula (1), and a silane coupler bonded with nano-titania,
wherein the silane coupler is a silane coupler with double bonds;

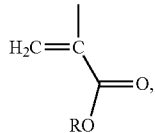

formula (1)

R is a C3-C8 perfluoroalkyl group.
Preferably, R is a C3-C8 linear-chain perfluoroalkyl group.

The preparation method in the present invention can be used to prepare the above-mentioned polymeric super-amphiphobic agent in the present invention.

According to the present invention, the C3-C8 perfluoroalkyl group may be perfluoropropyl, perfluorobutyl, perfluoropentyl, perfluorohexyl, perfluoroheptyl, or perfluorooctyl; it may be a linear-chain or branched-chain perfluoroalkyl group, preferably is a linear-chain perfluoroalkyl group, and more preferably is a C5-C8 perfluoroalkyl group or C6-C8 perfluoroalkyl group.

According to a preferred embodiment of the present invention, the silane coupler is used to modify the surface of the nano-titania, so as to obtain the silane coupler bonded with nano-titania. In order to obtain higher super-amphiphobic wettability, shale inhibition, lubrication, and reservoir protection properties, etc., preferably, with respect to 1 mol nano-titania, the silane coupler is used in an amount of 0.5 mol or more, more preferably 0.1-0.5 mol, further preferably 0.3-0.5 mol, more preferably 0.4-0.5 mol.

Since the polymeric super-amphiphobic agent in the present invention is obtained directly by controlling a copolymerized product of acrylamide, methyl methacrylate and butyl acrylate, a compound represented by the following formula (1), and a silane coupler bonded with nano-titania to have a crosslinking reaction, to facilitate the operation, the amounts of use of the monomers in the copolymerized product of acrylamide, methyl methacrylate and butyl acrylate in the preparation process may be selected according to the amount of use of the silane coupler bonded with nano-titania. Specifically, in order to obtain higher super-amphiphobic wettability, shale inhibition, lubrication, and reservoir protection properties, etc., with respect to 1 mol silane coupler bonded with nano-titania (measured in nano-titania), the acrylamide is used in an amount of 0.1 mol or more, the methyl methacrylate is used in an amount of 1 mol or more, and the butyl acrylate is used in an amount of 0.5 mol or less. More preferably, with respect to 1 mol silane coupler bonded with nano-titania (measured in nano-titania), the acrylamide is used in an amount of 0.5-4 mol, preferably 2-4 mol, more preferably 2-3 mol; the methyl methacrylate is used in an amount of 1-2 mol, preferably 1-1.5 mol; the butyl acrylate is used in an amount of 0.1-0.5 mol, preferably 0.3-0.5 mol, more preferably 0.4-0.5 mol.

In order to improve the super-amphiphobic property of the polymeric super-amphiphobic agent, preferably, with respect to 1 mol silane coupler bonded with nano-titania (measured in nano-titania), the compound represented by formula (1) is used in an amount of 0.5-1.5 mol, preferably 0.8-1.2 mol, more preferably 0.9-1.1 mol.

According to the present invention, the silane coupler may be any silane coupler, as long as the copolymerized product of acrylamide, methyl methacrylate and butyl acrylate, the compound represented by the following formula (1), and the nano-titania can be cross-linked; preferably, the silane coupler is one or more of γ-(methacryloyloxy) propyl-trimethoxysilane, γ-(2,3-epoxypropoxy) propyl-trimethoxysilane, vinyl-trimethoxysilane, and vinyl-triethoxysilane, preferably is γ-(methacryloyloxy) propyl-trimethoxysilane. By using the above silane coupler to crosslink the nano-titania, the obtained polymeric super-amphiphobic agent has an excellent temperature resistance property.

According to the present invention, for a purpose of further improving the temperature resistance property of the polymeric super-amphiphobic agent, the particle diameter of the nano-titania may be 50-200 nm, preferably is 50-100 nm.

According to the present invention, there is no particular restriction on the method and conditions for modifying the surface of the nano-titania with the silane coupler, as long as the silane coupler bonded with nano-titania can be obtained. For example, the silane coupler and the nano-titania may be controlled to contact with each other and treated for 2-8 h at 50-75° C., preferably treated for 4-6 h at 60-70° C. To ensure complete surface modification, preferably the surface modification is carried out under a stirring condition (e.g., at 350-450 rpm stirring rate).

According to a preferred embodiment of the present invention, the copolymerized product of acrylamide, methyl methacrylate and butyl acrylate is obtained through copolymerization of acrylamide, methyl methacrylate, and butyl acrylate. There is no particular restriction on the conditions of the copolymerization, as long as the acrylamide, methyl methacrylate, and butyl acrylate can be pre-polymerized; for example, the conditions of the copolymerization may include: the reaction temperature is 5-40° C. and the reaction time is 10-100 min.; preferably, the reaction temperature is 20-30° C. (e.g., 25° C. room temperature), and the reaction time is 30-45 min. To ensure complete copolymerization reaction, preferably the copolymerization reaction is carried out under a stirring condition (at 350-450 rpm stirring rate).

According to the present invention, for example, the conditions of the crosslinking reaction among the copolymerized product of acrylamide, methyl methacrylate and butyl acrylate, the compound represented by the following formula (1), and the silane coupler bonded with nano-titania may include: 60-90° C. reaction temperature and 1-10 h reaction time; preferably, the reaction temperature is 70-80° C., and the reaction time is 3-5 h.

In a third aspect, the present invention provides a polymeric super-amphiphobic agent obtained with the preparation method described above.

In a fourth aspect, the present invention provides an application of the above-mentioned polymeric super-amphiphobic agent as an additive in drilling fluids.

In a fifth aspect, the present invention provides a super-amphiphobic strongly self-cleaning high-performance water-based drilling fluid, comprising the above-mentioned polymeric super-amphiphobic agent.

In order to improve the properties of the obtained super-amphiphobic strongly self-cleaning high-performance water-based drilling fluid, preferably, with respect to 100 pbw water contained in the super-amphiphobic strongly self-cleaning high-performance water-based drilling fluid, the content of the polymeric super-amphiphobic agent in the super-amphiphobic strongly self-cleaning high-performance water-based drilling fluid is 2-5 pbw, such as 2-3 pbw or 3-4 pbw, etc.; specifically, the content of the polymeric super-amphiphobic agent may be 2.5 pbw, 3 pbw, 3.5 pbw, 4 pbw, 4.5 pbw, or 5 pbw, etc.

The super-amphiphobic strongly self-cleaning high-performance water-based drilling fluid in the present invention may further comprise other existing additives for water-based drilling fluids. For example, the super-amphiphobic strongly self-cleaning high-performance water-based drilling fluid may comprises one or more of bentonite, a filtrate reducer, a weighting material, and a plugging material. Preferably, the super-amphiphobic strongly self-cleaning high-performance water-based drilling fluid comprises the above-mentioned polymeric super-amphiphobic agent, bentonite, a filtrate reducer, a weighting material, and a plugging material added as required.

The filtrate reducer may be a polymeric filtrate reducer and/or an organic filtrate reducer, such as starch (carboxymethyl starch or hydroxypropyl starch, etc.), cellulose, resin, or acrylic polymer, etc.; the weighting material may be barite and/or limestone, for example. The plugging material may be an infiltration-oriented plugging material or a fracture-oriented plugging material. The fracture-oriented plugging material may be nut shells, fibers, or mica, etc., for example; the infiltration-oriented plugging material may be superfine calcium carbonate powder or vermiculite, etc., for example.

As a preferred technical scheme of the super-amphiphobic strongly self-cleaning high-performance water-based drilling fluid in the present invention, the super-amphiphobic strongly self-cleaning high-performance water-based drilling fluid comprises water, the above-mentioned polymeric super-amphiphobic agent, bentonite, a filtrate reducer, an optional weighting material, and a plugging material added as required.

With respect to 100 pbw water contained in the super-amphiphobic strongly self-cleaning high-performance water-based drilling fluid, the content of the bentonite may be 3-5 pbw, preferably is 3.5-4.5 pbw, such as 4 pbw; the content of the filtrate reducer may be 0.3-0.5 pbw, such as 0.5 pbw; the content of the weighting material may be selected according to the desired density of the drilling fluid, and may be 0-200 pbw, for example; the content of the plugging material may be 0-5 pbw, such as 3-5 pbw.

In a sixth aspect, the present invention provides a drilling method using the above-mentioned polymeric super-amphiphobic agent as an additive in drilling fluids.

Hereunder the present invention will be detailed in embodiments.

In the following examples, the KH570 (γ-(methacryloyloxy) propyl-trimethoxysilane), KH560 (γ-(2,3-epoxypropoxy) propyl-trimethoxysilane), nano-titania (particle diameter 80 nm), and bentonite are from Energy Chemical; the superfine calcium carbonate powder (1500-mesh, SD-Q8) is from Hebei Lingshou Guanghui Mineral Products Co., Ltd.

The filtrate reducer (in examples and the reference example 1) is filtrate reducer TCJ-2 for drilling fluid; the filtrate reducer (in reference example 2) is humic acid amide filtrate reducer TC-OL for drilling fluid; the silicone viscosity reducer is silicone viscosity reducer CHKJ for drilling fluid; the shearing strength improving agent (in examples and reference example 1) is flow pattern regulator TCTL-1 for drilling fluid; the shearing strength improving agent (in reference example 2) is polyamide derivative flow pattern regulator TC-OBV for oil-based drilling fluid; the amine inhibitor is shale organic amine inhibitor TAP-1 for drilling fluid; the wetting agent is amido polyether wetting agent TC-WET for oil-based drilling fluid; the emulsifier is aliphatic acid derivative emulsifier TC-PEM for drilling fluid; the suspending agent is tackifier TC-OC for oil-based drilling fluid; all of the above-mentioned materials are from Beijing Shida Bocheng Technology Co., Ltd.

Preparation Example 1

This preparation example is provided to describe the preparation method of the polymeric super-amphiphobic agent in the present invention.

(1) 0.5 mol KH570 and 1 mol nano-titania were added into 100 mL ethanol solution, and the mixture was stirred for 30 min. at 400 rpm for surface modification;
(2) 2 mol acrylamide, 1 mol methyl methacrylate, and 0.5 mol butyl acrylate were dissolved in 250 g water at room temperature, and the solution was stirred for 40 min. at 400 rpm to a homogeneous state;
(3) The product obtained in the step (1), the product obtained in the step (2), and perfluoro-n-octyl methacrylate (with respect to 1 mol nano-titania, the KH570 in the product obtained in the step (1) was 0.5 mol, the structural units derived from methyl methacrylate in the product obtained in the step (2) were 1 mol, and the perfluoro-n-octyl methacrylate was 1 mol) were mixed, heated up to 75° C., and had a reflux condensation reaction for 4 h; the synthetic product was washed with water and centrifuged cyclically for 4 times; thus, a polymeric super-amphiphobic agent SA was obtained.

Preparation Example 2

The method described in the preparation example 1 was used, but: the perfluoro-n-octyl methacrylate was replaced with perfluoro-n-propyl methacrylate in the same molar mass. Thus, a polymeric super-amphiphobic agent SA-2 was obtained.

Preparation Example 3

The method described in the preparation example 1 was used, but: the KH570 was replaced with KH560. Thus, a polymeric super-amphiphobic agent SA-3 was obtained.

Preparation Example 4

The method described in the preparation example 1 was used, but: with respect to 1 mol nano-titania, the acrylamide was used in an amount of 0.5 mol, the methyl methacrylate was used in an amount of 1 mol, the butyl acrylate was used in an amount of 0.5 mol, the compound represented by formula (1) (perfluoro-n-octyl methacrylate) was used in an amount of 1 mol, and the KH570 was used in an amount of 0.5 mol. Thus, a polymeric super-amphiphobic agent SA-4 was obtained.

Preparation Example 5

The method described in the preparation example 1 was used, but: with respect to 1 mol nano-titania, the acrylamide was used in an amount of 0.1 mol, the methyl methacrylate was used in an amount of 1 mol, the butyl acrylate was used in an amount of 0.5 mol, the compound represented by formula (1) (perfluoro-n-octyl methacrylate) was used in an amount of 0.5 mol, and the KH570 was used in an amount of 0.1 mol. Thus, a polymeric super-amphiphobic agent SA-5 was obtained.

Test Case 1

Ethanol solutions of the polymeric super-amphiphobic agent SA at different concentrations are prepared according to Table 1, and the water contact angle and n-cetane contact angle of each of the ethanol solutions on the surface of an artificial sandstone core with 10 mD permeability are measured with a XG-CAMB 1 contact angle meter from Shanghai Xuanyichuangxi Industrial Equipment Co., Ltd. The results are shown in Table 1.

TABLE 1

| Item Concentration/ | Deionized water contact angle/° | | | | | N-cetane contact angle/° | | | | |
|---|---|---|---|---|---|---|---|---|---|---|
| wt % | 1 | 2 | 3 | 4 | 5 | 1 | 2 | 3 | 4 | 5 |
| SA | 75.4 | 111.7 | 165.3 | 166.6 | 166.8 | 63.6 | 106.8 | 155.5 | 156.7 | 155.2 |

As can be seen from Table 1, when the concentration of the polymeric super-amphiphobic agent SA is 2 wt % or higher, the water contact angle is greater than 110°, and the n-cetane contact angle is greater than 105°; when the concentration of the polymeric super-amphiphobic agent SA is 3 wt % or higher, the water contact angle is greater than 165°, and the n-cetane contact angle is greater than 150°. Apparently the polymeric super-amphiphobic agent SA in the present invention can effectively improve the hydrophobic and oleophobic properties of rock core surface; furthermore, when the concentration of the polymeric super-amphiphobic agent is 3 wt % or higher, the water contact angle of the treated rock core surface is greater than 165°, and the oil contact angle is greater than 150°, which indicate that the rock core surface is imparted with super-amphiphobic wettability.

Drilling Fluid Preparation Examples

The preparation examples are provided to describe the preparation method of super-amphiphobic strongly self-cleaning high-performance water-based drilling fluid in the present invention.

The components were mixed at the following mixture ratios, to obtain the super-amphiphobic strongly self-cleaning high-performance water-based drilling fluids (also referred to as super-amphiphobic water-based drilling fluids) in the examples, the water-based drilling fluid in reference example 1, and the oil-based drilling fluid in reference example 2.

Reference Example 1

100 pbw water+4 pbw bentonite+0.3 pbw NaOH+0.5 pbw filtrate reducer+1 pbw silicone viscosity reducer+1 pbw shearing strength improving agent+0.5 pbw amine inhibitor+4 pbw superfine calcium carbonate powder; thus, a reference water-based drilling fluid 1 is obtained.

Reference Example 2

100 pbw 5# white oil+0.5 pbw NaCl+3 pbw suspending agent+0.5 pbw filtrate reducer+3 pbw wetting agent+0.5 pbw emulsifier+1 pbw shearing strength improving agent; thus, a reference oil-based drilling fluid 2 was obtained.

Example 1

100 pbw water+4 pbw bentonite+0.3 pbw NaOH+0.5 pbw filtrate reducer+4 pbw superfine calcium carbonate powder+3 pbw polymeric super-amphiphobic agent SA; thus, a super-amphiphobic water-based drilling fluid 1 was obtained.

Example 2 the polymeric super-amphiphobic agent SA was replaced with the polymeric super-amphiphobic agent SA-2; thus, a super-amphiphobic water-based drilling fluid 2 was obtained.

Example 3 the polymeric super-amphiphobic agent SA was replaced with the polymeric super-amphiphobic agent SA-3; thus, a super-amphiphobic water-based drilling fluid 3 was obtained.

Example 4 the polymeric super-amphiphobic agent SA was replaced with the polymeric super-amphiphobic agent SA-4; thus, a super-amphiphobic water-based drilling fluid 4 was obtained.

Example 5 the polymeric super-amphiphobic agent SA was replaced with the polymeric super-amphiphobic agent SA-5; thus, a super-amphiphobic water-based drilling fluid 5 was obtained.

The densities of the drilling fluids in the above examples and reference examples are 1.2 g/cm$^3$.

Test Case 2:

This test case is used to evaluate the wettability of the drilling fluid.

The super-amphiphobic water-based drilling fluid in example 1 was measured with the wettability evaluation method in the industry standard SY/T 5153-2007 using API and HTHP filter cakes. The measurements were repeated for 3 times respectively, and the results are shown in Table 2.

TABLE 2

| Item | Deionized water contact angle/° | | | N-cetane contact angle/° | | |
|---|---|---|---|---|---|---|
| No. | 1 | 2 | 3 | 1 | 2 | 3 |
| API | 158.2 | 156.3 | 157.6 | 150.7 | 151.6 | 150.4 |
| HTHP | 157.6 | 156.8 | 157.4 | 150.1 | 150.5 | 150.2 |

As can be seen from Table 2, the super-amphiphobic water-based drilling fluid in the present invention exhibits hydrophobic and oleophobic wettability on the surfaces of API and HTHP filter cakes, and the water contact angles are greater than 155° and the oil contact angles are greater than 150° on the surfaces of the API and HTHP filter cakes, indicating that super-amphiphobic wettability is achieved.

Test Case 3

This test case is used to evaluate the inhibition property of the drilling fluid.

The swelling heights of manually compacted rock cores within 24 h was measured with a shale swelling tester according to the shale inhibition evaluation method in the industry standard SY/T 6335-1997, to evaluate the inhibition property of the drilling fluids in the examples and the reference examples. The results are shown in Table 3.

Hot rolling was carried out for 16 h at 120° C. according to the method for testing physical and chemical properties of mud shale in the industry standard SY/T 5613-2000, to evaluate the influence of the drilling fluids in the examples and the reference examples on the rolling recovery ratio of mud shale. The results are shown in Table 4.

TABLE 3

| Time | Swelling height at 2 h (mm) | Swelling height at 6 h (mm) | Swelling height at 12 h (mm) | Swelling height at 24 h (mm) |
|---|---|---|---|---|
| Reference example 2 | 0.68 | 0.95 | 1.21 | 2.18 |
| Reference example 1 | 0.91 | 1.42 | 1.89 | 2.76 |
| Example 1 | 0.72 | 0.98 | 1.34 | 2.15 |
| Example 2 | 0.75 | 1.11 | 1.46 | 2.25 |
| Example 3 | 0.78 | 1.19 | 1.52 | 2.43 |

TABLE 3-continued

| Time | Swelling height at 2 h (mm) | Swelling height at 6 h (mm) | Swelling height at 12 h (mm) | Swelling height at 24 h (mm) |
|---|---|---|---|---|
| Example 4 | 0.80 | 1.25 | 1.65 | 2.52 |
| Example 5 | 0.84 | 1.31 | 1.76 | 2.66 |

As can be seen from Table 3, according to the comparison result of linear swelling inhibition property of drilling fluid between the examples and the reference examples, the linear swelling inhibition property of the drilling fluids in the examples is much better than that of conventional water-based drilling fluids, wherein the inhibition property of the drilling fluid in the example 1 is equivalent to that of conventional oil-based drilling fluids.

TABLE 4

| Drilling fluid | Rolling recovery ratio/% |
|---|---|
| Reference example 2 | 98.2 |
| Reference example 1 | 75.5 |
| Example 1 | 97.1 |
| Example 2 | 93.8 |
| Example 3 | 88.2 |
| Example 4 | 83.6 |
| Example 5 | 79.3 |

As can be seen from Table 4, according to the comparison result of rolling recovery ratio of shale between the drilling fluids in the examples and the drilling fluids in the reference examples, the rolling recovery ratios attained by the drilling fluids in the examples are much better than those attained by conventional water-based drilling fluids, and are equivalent to the rolling recovery ratios attained by conventional oil-based drilling fluids.

According to the comparison result between the super-amphiphobic water-based drilling fluid in the present invention, conventional water-based drilling fluids and conventional organic drilling fluids, the super-amphiphobic water-based drilling fluid in the present invention has an excellent inhibition property.

Test Case 4

This test case is used to evaluate the lubricating property of the drilling fluid.

According to the method for evaluating the lubrication coefficient of drilling fluid in the industry standard SY/T 6622-2005, 3% polymeric super-amphiphobic agent product was added into a drilling fluid system, the drilling fluid was stirred for 20 min., and then the lubrication coefficient of the drilling fluid was measured with an extreme pressure (EP) lubrication tester (EP-2A from Qingdao Senxin Electromechanical Equipment Co., Ltd.); after the measurement, the drilling fluid was loaded into an aging can, and aged for 16 h at 120° C.; then the drilling fluid was taken out and stirred for 20 min, and the lubrication coefficient of the drilling fluid system was measured again; then the lubrication effect was evaluated.

TABLE 5

| Drilling Fluid | Reduction ratio of lubrication coefficient/% | Viscosity coefficient of filter cake |
|---|---|---|
| Reference example 2 | 91.6 | 0.058 |

TABLE 5-continued

| Drilling Fluid | Reduction ratio of lubrication coefficient/% | Viscosity coefficient of filter cake |
|---|---|---|
| Reference example 1 | 75.9 | 0.141 |
| Example 1 | 90.3 | 0.061 |
| Example 2 | 87.2 | 0.072 |
| Example 3 | 85.5 | 0.084 |
| Example 4 | 83.1 | 0.101 |
| Example 5 | 79.6 | 0.122 |

As can be seen from Table 5, the lubricating property of the super-amphiphobic water-based drilling fluid system in the present invention is much better than that of conventional water-based drilling fluids, and is equivalent to the lubricating property of conventional oil-based drilling fluids. The reduction ratio of lubrication coefficient of the present super-amphiphobic water-based drilling fluid is 90% or higher, and the viscosity coefficient of filter cake is reduced to 0.70 or lower.

Test Case 5

This test case is used to evaluate the reservoir protection property of the drilling fluid.

Hot rolling was carried out for 16 h at 120° C. according to the method for testing reservoir protection performance of drilling fluid in the industry standard SY/T 5613-2000, to evaluate the influence of the drilling fluids on the rolling recovery ratio of mud shale. The results are shown in Table 6.

TABLE 6

| Group | Drilling fluid | Porosity of rock core/% | K1/mD | K2/mD | R/% | Contamination depth/cm |
|---|---|---|---|---|---|---|
| 1 | Reference example 1 | 10.64 | 19.74 | 14.92 | 75.58 | 1.25 |
|   | Example 1 | 11.77 | 22.68 | 19.51 | 86.02 | 0.85 |
| 2 | Reference example 1 | 8.41 | 9.45 | 7.70 | 81.48 | 0.95 |
|   | Example 1 | 8.62 | 11.23 | 10.47 | 92.23 | 0.50 |
| 3 | Reference example 1 | 5.47 | 5.47 | 4.43 | 80.99 | 0.70 |
|   | Example 1 | 5.91 | 4.96 | 4.68 | 94.35 | 0.45 |
| 4 | Reference example 1 | 2.66 | 1.33 | 1.12 | 84.21 | 0.65 |
|   | Example 1 | 2.38 | 1.28 | 1.23 | 96.09 | 0.25 |

As can be seen from Table 6, according to the comparison result of reservoir protection for rock cores with different permeability properties between the super-amphiphobic strongly self-cleaning high-performance water-based drilling fluid in the present invention and conventional water-based drilling fluids, the reservoir protection property of the super-amphiphobic strongly self-cleaning high-performance water-based drilling fluid is better than that of conventional water-based drilling fluids; besides, it is found that the permeability recovery ratio is higher and the rock core contamination depth is lower as the permeability of rock core is decreased, which indicates that the reservoir protection property of the super-amphiphobic strongly self-cleaning high-performance water-based drilling fluid is increasing.

Drilling Fluid Preparation Example 2

This preparation example is used to describe the preparation of drilling fluids at different densities.

Reference Example 1-1.6

100 pbw water+4 pbw bentonite+0.3 pbw NaOH+0.5 pbw filtrate reducer+1 pbw silicone viscosity reducer+1 pbw shearing strength improving agent+0.5 pbw amine inhibitor+4 pbw superfine calcium carbonate powder+2 pbw lubricant+87.5 pbw barite; thus, a water-based drilling fluid at 1.6 g/cm$^3$ density was obtained.

Example 1-1.6

100 pbw water+4 pbw bentonite+0.3 pbw NaOH+0.5 pbw filtrate reducer+4 pbw superfine calcium carbonate powder+3 pbw polymeric super-amphiphobic agent SA+87.5 pbw barite; thus, a super-amphiphobic water-based drilling fluid at 1.6 g/cm$^3$ density was obtained.

Reference Example 1-1.8

100 pbw water+4 pbw bentonite+0.3 pbw NaOH+0.5 pbw filtrate reducer+1 pbw silicone viscosity reducer+1 pbw shearing strength improving agent+0.5 pbw amine inhibitor+4 pbw superfine calcium carbonate powder+2 pbw lubricant+125 pbw barite; thus, a water-based drilling fluid at 1.8 g/cm$^3$ density was obtained.

Example 1-1.8

100 pbw water+4 pbw bentonite+0.3 pbw NaOH+0.5 pbw filtrate reducer+4 pbw superfine calcium carbonate powder+3 pbw polymeric super-amphiphobic agent SA+125 pbw barite; thus, a super-amphiphobic water-based drilling fluid at 1.8 g/cm$^3$ density was obtained.

Reference Example 1-2.0

100 pbw water+4 pbw bentonite+0.3 pbw NaOH+0.5 pbw filtrate reducer+1 pbw silicone viscosity reducer+1 pbw shearing strength improving agent+0.5 pbw amine inhibitor+4 pbw superfine calcium carbonate powder+2 pbw lubricant+175 pbw barite; thus, a water-based drilling fluid at 2.0 g/cm$^3$ density was obtained.

Example 1-2.0

100 pbw water+4 pbw bentonite+0.3 pbw NaOH+0.5 pbw filtrate reducer+4 pbw superfine calcium carbonate powder+3 pbw polymeric super-amphiphobic agent SA+175 pbw barite; thus, a super-amphiphobic water-based drilling fluid at 2.0 g/cm$^3$ density was obtained.

Test Case 6

This test case is used to evaluate the rheology and fluid loss property of the drilling fluid.

The rheology and fluid loss property of the super-amphiphobic water-based drilling fluid obtained in the above drilling fluid preparation example 2 and the rheology and fluid loss property of conventional water-based drilling fluids were measured with a six-speed viscosity meter. The results are shown in Tables 7-9.

In tables 7-9, "PV" refers to plastic viscosity, and is measured with a Fann six-speed viscosity meter (Znn-d6 from Qingdao Hengtaida Electromechanical Equipment Co., Ltd., the same below), in unit of mpa th $$PV = \theta_{600} - \theta_{300}$$

"AV" refers to apparent viscosity, and is measured with a Fann six-speed viscosity meter, in unit of mpax−;

$$AV = \frac{1}{2}\theta_{600}$$

"YP" refers to yield value, and is obtained through calculation from the data measured with a Fann six-speed viscosity meter, in unit of Pa;

$$YP = 0.511(\theta_{300} - PV)$$

"G10″/G10′" refers to initial gel strength/final gel strength, and is obtained through calculation from the data measured with a Fann six-speed viscosity meter, in unit of Pa/Pa;

Initial Gel Strength=0.511a$_3$ (10 s)

Final Gel Strength=0.511$_3$ (10 min)

"API" refers to fluid loss at intermediate pressure, and is measured with an API fluid loss meter (SD6 from Qingdao Hengtaida Electromechanical Equipment Co., Ltd.), in unit of mL;

"HTHP" refers to fluid loss at high temperature and high pressure, and is measured with a HTHP fluid loss meter (HDF-1 from Qingdao Hengtaida Electromechanical Equipment Co., Ltd.), in unit of mL.

TABLE 7

| | Apparent viscosity AV/mpant | Plastic viscosity PV/mpac | Yield value YP/pa | G10″/ G10′/ Pa/Pa | API/ ml | HTHP/ ml |
|---|---|---|---|---|---|---|
| Room temperature | | | | | | |
| Reference example 1-1.6 | 78.5 | 54 | 25.04 | 2.5/13 | 5 | |
| Example 1-1.6 | 80.5 | 61 | 19.93 | 2.5/9.5 | 3.4 | |
| After aging at 120° C. for 16 h | | | | | | |
| Reference example 1-1.6 | 113 | 96 | 17.37 | 2.5/7 | 4.6 | 18 |
| Example 1-1.6 | 88 | 70 | 18.40 | 2/4 | 4.8 | 12 |

TABLE 8

| | Apparent viscosity AV/mpant | Plastic viscosity PV/mpac | Yield value YP/pa | G10″/ G10′/ Pa/Pa | API/ ml | HTHP/ ml |
|---|---|---|---|---|---|---|
| Room temperature | | | | | | |
| Reference example 1-1.8 | 83 | 60 | 23.51 | 2.5/8.5 | 3.4 | |
| Example 1-1.8 | 82.5 | 61 | 21.97 | 2/7 | 3.2 | |
| After aging at 120° C. for 16 h | | | | | | |
| Reference example 1-1.8 | 112.5 | 92 | 20.95 | 2.5/5 | 4.8 | 22 |
| Example 1-1.8 | 102.5 | 79 | 24.02 | 2/3.5 | 3.8 | 18 |

TABLE 9

| | Apparent viscosity AV/mpant | Plastic viscosity PV/mpac | Yield value YP/pa | G10″/ G10′/ Pa/Pa | API/ ml | HTHP/ ml |
|---|---|---|---|---|---|---|
| Room temperature | | | | | | |
| Reference example 1-2.0 | 100 | 85 | 15.33 | 1/6.5 | | |
| Example 1-2.0 | 97.5 | 82 | 15.84 | 1/4.5 | | |

TABLE 9-continued

|  | Apparent viscosity AV/mpant | Plastic viscosity PV/mpac | Yield value YP/pa | G10″/ G10′/ Pa/Pa | API/ ml | HTHP/ ml |
|---|---|---|---|---|---|---|
| After aging at 120° C. for 16 h |  |  |  |  |  |  |
| Reference example 1-2.0 | 57 | 45 | 9.71 | 0/0 | 8.4 | 22.4 |
| Example 1-2.0 | 51.5 | 39 | 12.78 | 5/6 | 4.4 | 12 |

As can be seen from the above experimental results, the super-amphiphobic strongly self-cleaning high-performance water-based drilling fluid system in the present invention has better viscosity breaking and fluid loss reduction effects under the condition of 1.6-2.0 g/cm³, compared with conventional water-based drilling fluid systems. Moreover, the lower the density of the system is, the more obvious the viscosity breaking effect is. The HTHP fluid loss of the system can be reduced remarkably. Generally speaking, the super-amphiphobic strongly self-cleaning high-performance water-based drilling fluid system has an excellent rheology and fluid loss reduction property.

While the present invention is described above in detail in some preferred embodiments, the present invention is not limited to those embodiments. Various simple variations, including combinations of the technical features in any other appropriate way, can be made to the technical scheme of the present invention within the scope of the technical concept of the present invention, but such variations and combinations shall be deemed as disclosed content in the present invention and falling in the protection scope of the present invention.

The invention claimed is:

1. A super-amphiphobic strongly self-cleaning high-performance water-based drilling fluid comprising a polymeric super-amphiphobic agent,
the polymeric super-amphiphobic agent comprising structural units A derived from acrylamide, structural units B derived from methyl methacrylate, structural units C derived from butyl acrylate, structural units D derived from a compound represented by the following formula (1), structural units E derived from a silane coupler, and nano-titania;
wherein the nano-titania is bonded to the polymeric super-amphiphobic agent via the structural unit E,
the silane coupler is one or more of a silane coupler with double bonds or γ-(2,3-epoxypropoxy) propyl-trimethoxysilane;

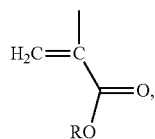

formula (1)

R is a C3-C8 perfluoroalkyl group.

2. The super-amphiphobic strongly self-cleaning high-performance water-based drilling fluid according to claim 1, wherein R is a C3-C8 linear-chain perfluoroalkyl group.

3. The super-amphiphobic strongly self-cleaning high-performance water-based drilling fluid according to claim 1, wherein the silane coupler is one or more of γ-(methacryloyloxy) propyl-trimethoxysilane, vinyl-trimethoxysilane, and vinyl-triethoxysilane.

4. The super-amphiphobic strongly self-cleaning high-performance water-based drilling fluid according to claim 1, wherein the nano-titania has a particle diameter of 50-200 nm.

5. The super-amphiphobic strongly self-cleaning high-performance water-based drilling fluid according to claim 1, wherein with respect to 1 mol nano-titania, the content of the structural units A is 0.1 mol or higher, the content of the structural units B is 1 mol or higher, the content of the structural units C is 0.5 mol or lower, the content of the structural units D is 0.5-1.5 mol, and the content of the structural units E is 0.5 mol or lower.

6. The super-amphiphobic strongly self-cleaning high-performance water-based drilling fluid according to claim 5, wherein with respect to 1 mol nano-titania, the content of the structural units A is 0.5-4 mol, the content of the structural units B is 1-2 mol, the content of the structural units C is 0.1-0.5 mol, the content of the structural units D is 0.5-1.5 mol, and the content of the structural units E is 0.1-0.5 mol.

7. The super-amphiphobic strongly self-cleaning high-performance water-based drilling fluid according to claim 1, wherein with respect to 100 pbw water contained in the super-amphiphobic strongly self-cleaning high-performance water-based drilling fluid, the content of the polymeric super-amphiphobic agent is 2-5 pbw.

8. The super-amphiphobic strongly self-cleaning high-performance water-based drilling fluid according to claim 1, wherein the super-amphiphobic strongly self-cleaning high-performance water-based drilling fluid further comprises bentonite, a filtrate reducer, an optional weighting material, and an optional plugging material.

9. The super-amphiphobic strongly self-cleaning high-performance water-based drilling fluid according to claim 8, wherein with respect to 100 pbw water contained in the super-amphiphobic strongly self-cleaning high-performance water-based drilling fluid, the content of the bentonite is 3-5 pbw, the content of the filtrate reducer is 0.3-0.5 pbw, the content of the weighting material is 0-200 pbw, and the content of the plugging material is 0-5 pbw.

10. A method of drilling a well comprising:
contacting the well-bore with a polymeric super-amphiphobic agent, the polymeric super-amphiphobic agent comprising structural units A derived from acrylamide, structural units B derived from methyl methacrylate, structural units C derived from butyl acrylate, structural units D derived from a compound represented by the following formula (1), structural units E derived from a silane coupler, and nano-titania as an additive in a drilling fluid;
wherein the nano-titania is bonded to the polymeric super-amphiphobic agent via the structural unit E,
the silane coupler is one or more of a silane coupler with double bonds or γ-(2,3-epoxypropoxy) propyl-trimethoxysilane;

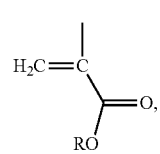

formula (1)

R is a C3-C8 perfluoroalkyl group.

11. The method according to claim 10, wherein the R is a C3-C8 linear-chain perfluoroalkyl group.

12. The method according to claim 10, wherein the silane coupler is one or more of γ-(methacryloyloxy) propyl-trimethoxysilane, vinyl-trimethoxysilane, and vinyl-triethoxysilane.

13. The method according to claim 10, wherein nano-titania has a particle diameter of 50-200 nm.

14. The method according to claim 10, wherein with respect to 1 mol nano-titania, the content of the structural units A is 0.1 mol or higher, the content of the structural units B is 1 mol or higher, the content of the structural units C is 0.5 mol or lower, the content of the structural units D is 0.5-1.5 mol, and the content of the structural units E is 0.5 mol or lower.

15. The method according to claim 14, wherein with respect to 1 mol nano-titania, the content of the structural units A is 0.5-4 mol, the content of the structural units B is 1-2 mol, the content of the structural units C is 0.1-0.5 mol, the content of the structural units D is 0.5-1.5 mol, and the content of the structural units E is 0.1-0.5 mol.

\* \* \* \* \*

UNITED STATES PATENT AND TRADEMARK OFFICE
CERTIFICATE OF CORRECTION

PATENT NO. : 10,442,973 B1
APPLICATION NO. : 16/392395
DATED : April 23, 2019
INVENTOR(S) : Guancheng Jiang et al.

It is certified that error appears in the above-identified patent and that said Letters Patent is hereby corrected as shown below:

On the Title Page

Inventors should read:
Guancheng JIANG, Beijing (CN);
Xiaoxiao NI, Beijing (CN);
Lili YANG, Beijing (CN);
Yinbo HE, Beijing (CN);
Jinsheng SUN, Beijing (CN);
Chunyao PENG, Beijing (CN);
Yan BAI, Beijing (CN);
Jingping LIU, Beijing (CN);
Xianbin HUANG, Beijing (CN);
Xuwu LUO, Beijing (CN);
Guangchang MA, Beijing (CN);
Yongbin GUO, Beijing (CN);
Fabin XU, Beijing (CN);
Zehengqiang DENG, Beijing (CN);
Deli GAO, Beijing (CN);
Kai WANG, Beijing (CN)

Signed and Sealed this
Twelfth Day of January, 2021

Andrei Iancu
*Director of the United States Patent and Trademark Office*